US008869086B1

(12) United States Patent
Tener et al.

(10) Patent No.: US 8,869,086 B1
(45) Date of Patent: Oct. 21, 2014

(54) SMALL, ADAPTABLE, REAL-TIME, SCALABLE IMAGE PROCESSING CHIP

(71) Applicant: Lockheed Martin Corporation, Bethesda, MD (US)

(72) Inventors: Gene D. Tener, Oviedo, FL (US); Mark A. Goodnough, Santa Ynez, CA (US); Jennifer K. Park, Winter Springs, FL (US); Walter David Borowski, Ocoee, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/067,026

(22) Filed: Oct. 30, 2013

Related U.S. Application Data

(62) Division of application No. 12/580,900, filed on Oct. 16, 2009, now Pat. No. 8,601,421.

(60) Provisional application No. 61/106,005, filed on Oct. 16, 2008.

(51) Int. Cl.
*G06F 17/50* (2006.01)
*G06T 1/20* (2006.01)

(52) U.S. Cl.
CPC ............................................ *G06T 1/20* (2013.01)
USPC .............................. 716/116; 716/117; 716/138

(58) Field of Classification Search
CPC ................. G06F 17/5054; G06F 21/76; G06F 2213/0038
USPC .................................. 716/100, 116–117, 138
See application file for complete search history.

(56) References Cited

U.S. PATENT DOCUMENTS

| 2002/0050518 | A1* | 5/2002 | Roustaei | 235/454 |
| 2006/0255144 | A1* | 11/2006 | Meier et al. | 235/454 |
| 2006/0283952 | A1* | 12/2006 | Wang | 235/462.01 |
| 2008/0074646 | A1 | 3/2008 | Archibald | |
| 2008/0302956 | A1 | 12/2008 | Anderson | |
| 2008/0304126 | A1 | 12/2008 | Powell et al. | |
| 2009/0004454 | A1 | 1/2009 | Aumaugher et al. | |
| 2009/0151364 | A1 | 6/2009 | Dicken et al. | |
| 2010/0046853 | A1 | 2/2010 | Goodnough et al. | |
| 2010/0226495 | A1* | 9/2010 | Kelly et al. | 380/30 |

OTHER PUBLICATIONS

Non-final Office Action for U.S. Appl. No. 12/580,900 mailed Apr. 3, 2013, 9 pages.

* cited by examiner

*Primary Examiner* — Paul Dinh
(74) *Attorney, Agent, or Firm* — Withrow & Terranova, PLLC

(57) ABSTRACT

An imaging solution that uses a small, adaptable, real-time, scalable, image-processing (SMARTS IP) chip configured to function like any one of a wide range of specialized FPA imaging devices, and a method for configuring and implementing same is provided. Configuration for a wide range of applications and implementations, including ones with or without IDCA assemblies or other types of dewar/cooler structures, is disclosed. A wide range of output data formats, including all SDI-compatible image data formats, may be accomplished. Frame stacking and variable effective resolution and charge well depth levels may be accomplished in output image data based on on-chip image processing techniques. On-chip image processing algorithms may include XR™, DRC, NUC, and other similar or related techniques. Image data output compression through on-chip processing is also disclosed.

10 Claims, 6 Drawing Sheets

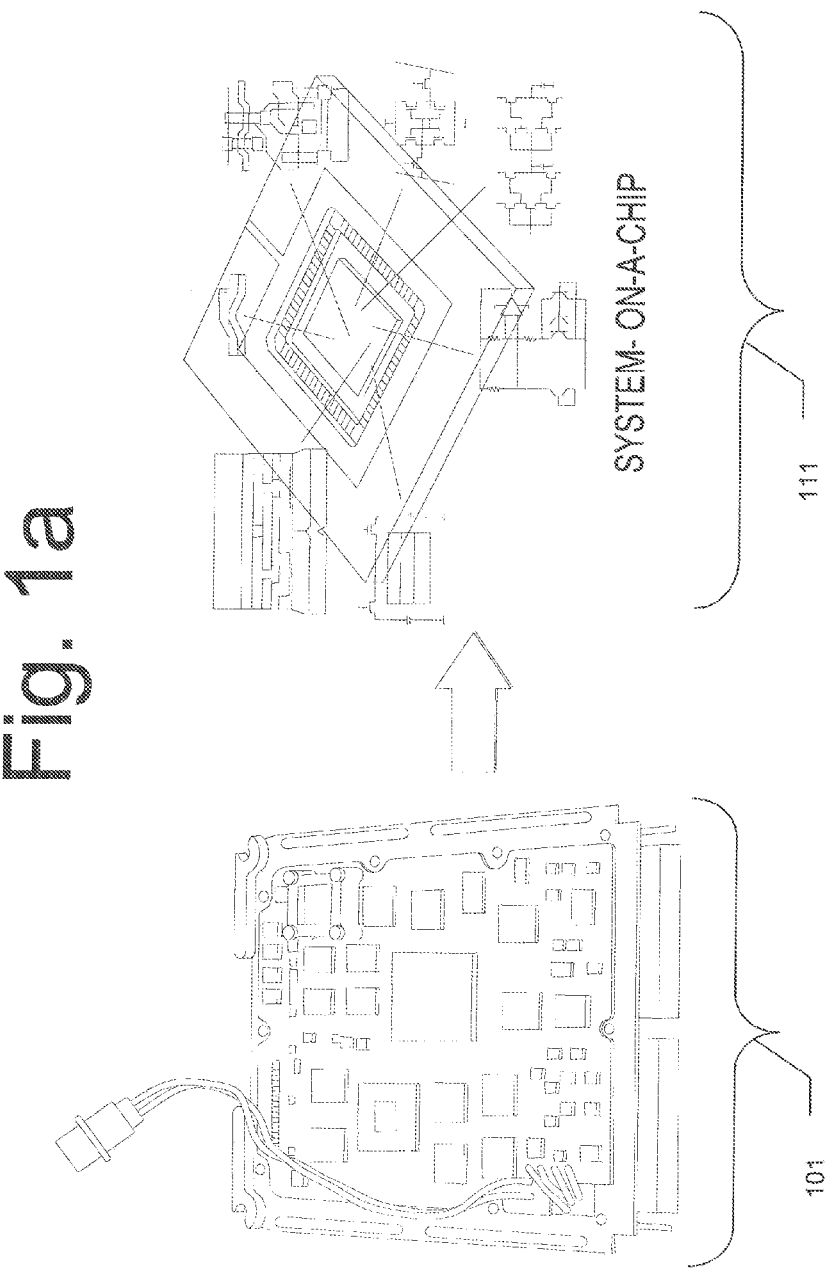

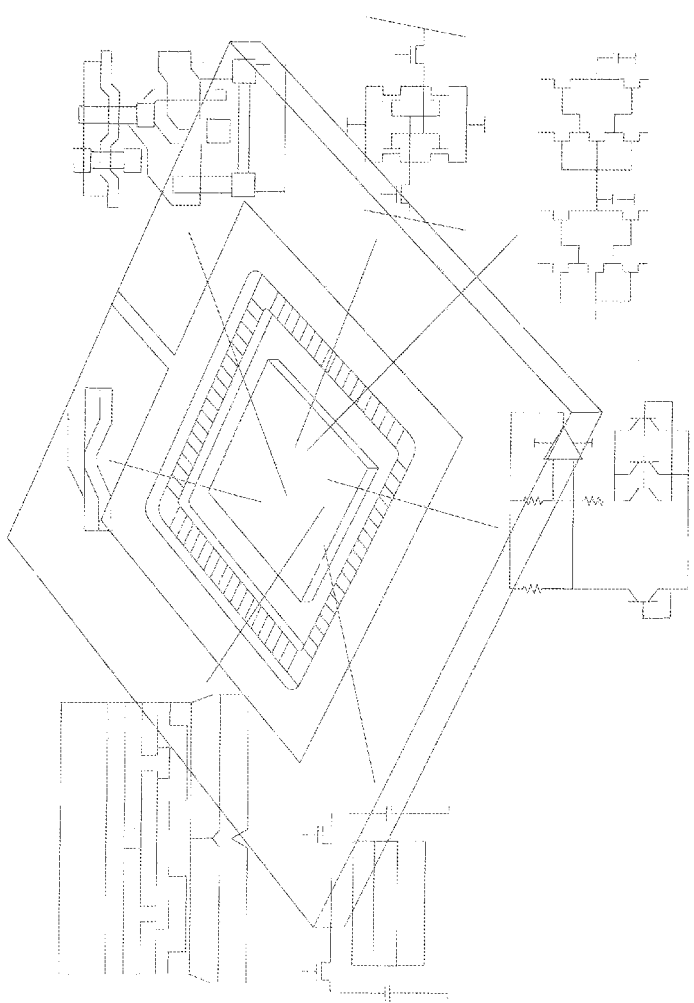

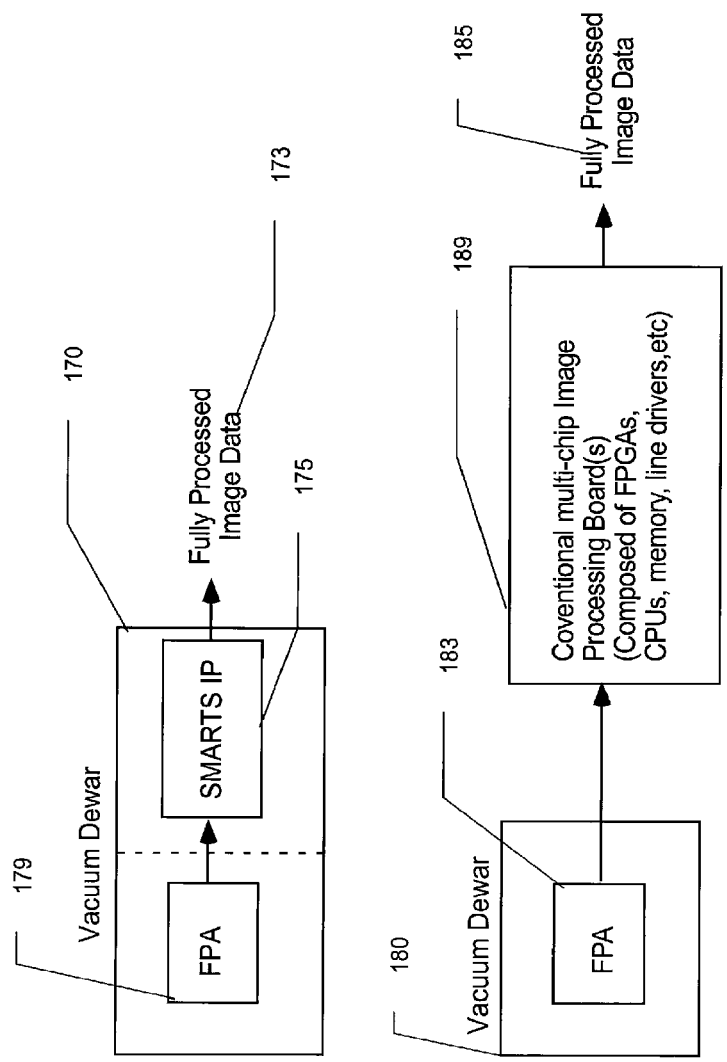

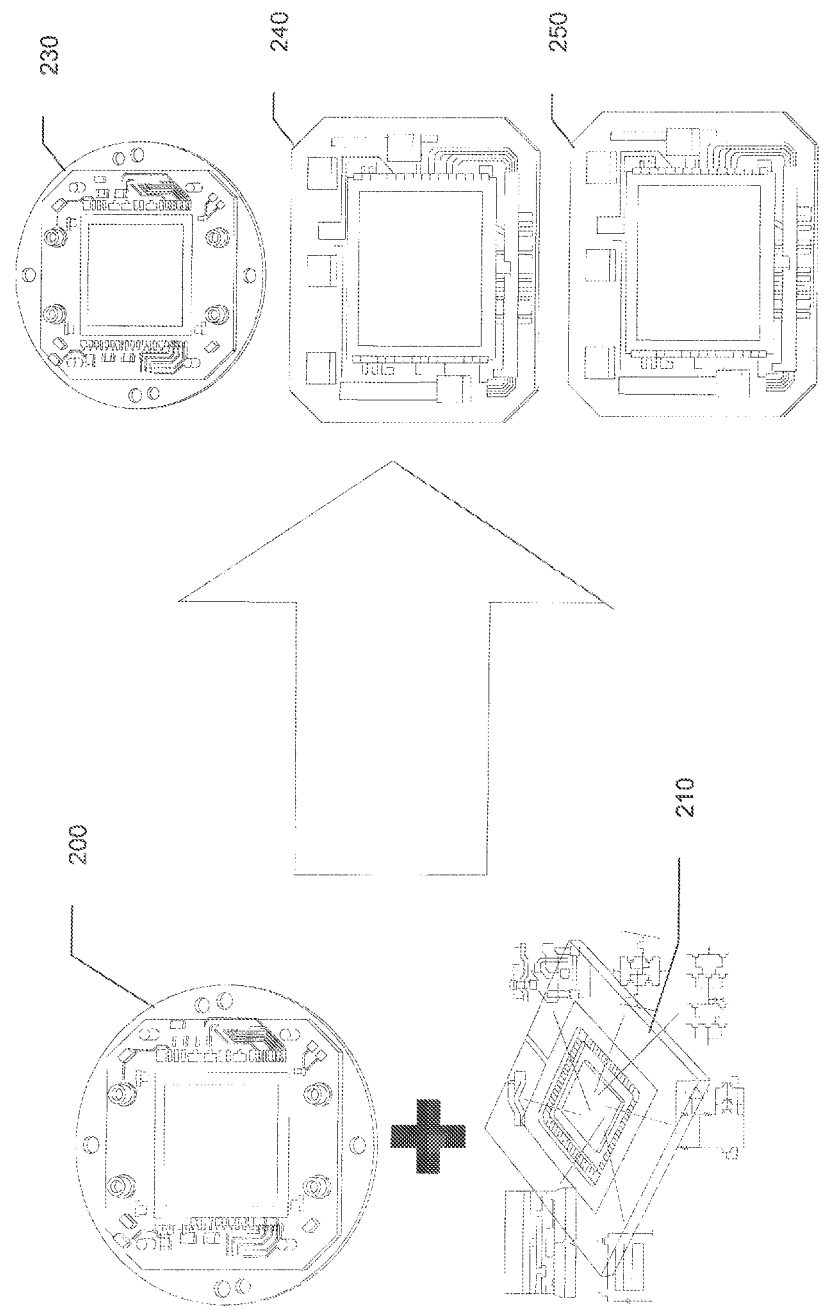

SMALL, ADAPTABLE, REAL-TIME, SCALABLE IMAGE PROCESSING CHIP

RELATED APPLICATIONS

This patent application claims priority to and is a divisional of co-pending U.S. patent application Ser. No. 12/580,900, entitled "SMALL, ADAPTABLE, REAL-TIME, SCALABLE IMAGE PROCESSING CHIP," filed on Oct. 16, 2009, which claims priority to and is a non-provisional of U.S. Provisional Patent Application Ser. No. 61/106,005, entitled "SMALL, ADAPTABLE REAL-TIME, SCALEABLE IMAGE PROCESSING (SMARTS IP) CHIP," filed on Oct. 16, 2008, the disclosures of each of which are hereby incorporated herein by reference in their entireties.

BACKGROUND OF THE INVENTION

1. Field of the Invention

The present invention pertains to versatile system-on-a-chip solutions for image data processing. Specifically, the present invention relates to a chip-based replacement for image processing electronics suites and to mass-customizable image processing platforms that can be configured to produce a wide range of image capture and data output capabilities.

2. Description of Related Art

Currently, a broad range of specialized focal plane array (FPA) imaging devices exist, but their commercial utility is limited by the cost of producing them in relatively limited quantities. Most FPA devices and/or their associated read-out integrated circuits (ROICs) are dedicated to a single program or single operational purpose. It is very expensive to develop, maintain, and produce many different FPA and ROIC versions. A specialized FPA device may cost as much as $250,000 to $500,000 and involve production times of several months or longer depending on the complexity of the device and the manufacturing processes involved.

It would be an advance in the art to create a mass-customizable image processing chip that could be configured post-production for a broad range of imaging applications and operational purposes. Such a device would allow the realization of economies of scale and production cycle optimizations associated with large-scale production operations for devices that can be later adapted for a wide range of specific, specialized purposes.

Current advanced imaging solutions are also considered cost-limited due to the cost and power requirements of their associated circuit cards and the inherent cost of migrating from system to system or solution to solution. It would be an advance in the art to create an advanced image processing solution that has a low associated power consumption and allows for standardization of associated required hardware.

SUMMARY OF THE INVENTION

The present invention seeks to address the above cost and production time issues by introducing a small, adaptable, real-time, scalable, image-processing (SMARTS IP) chip that can be configured to function like any one of a wide range of specialized FPA imaging devices. A SMARTS IP chip according to the present invention may include a high-resolution FPA designed to mimic the configuration of a variety of FPAs, thereby reducing hardware development, maintenance, and production costs. An embodiment of the present invention may fit within the warm area of a dewar to enable improvements in signal-to-noise ratio (SNR) via frame stacking, bandwidth reduction, format conversion, and electronic stabilization prior to output at the IDCA pins. The IDCA (Integrated-Detector-Cooler-Assembly) is a composite structure that may include an FPA, a vacuum dewar housing, a cooling mechanism, and support electronics including an embodiment of a SMARTS IP chip. In some embodiments, an embodiment of a SMARTS IP chip could be integrated just outside the dewar next to the FPA. For embodiments not using cooled FPAs, an embodiment of the chip may be integrated between the imaging detector and the display, tracker, or ATR.

Previously, advanced image processing solutions, especially ones for low-cost man portable equipment such as anti-tank missiles and similar strike weapons, were considered cost-limited due to the cost and power requirements of circuit cards and the inherent cost of migration from system to system. The present invention is small and has low power consumption requirements, and may be horizontally integrated to reduce recurring systems and software costs. Furthermore, embodiments of the present invention may allow for insertion of the chip into the DCA, thereby simplifying device interfaces without negatively impacting form factor.

Advantages of the present invention include implementing specialized and customizable image processing functions in low-cost man portable equipment, single-use items, and targeting/tracking systems. The present invention significantly reduces the hardware cost of the imaging components by making it possible to engage in high-volume production of one configurable device and thereby realize economies of scale. This is especially useful in applications where the FPA device is part of a single-use items such as a weapon or defense system that is typically destroyed during or immediately after use. The present invention also allows any device equipped with the SMARTS IP chip to be configured with any of the imaging properties and characteristics that the SMARTS IP chip can exhibit, thereby making a wide range of image processing functions available to low-cost, portable and/or disposable devices.

The present invention dramatically reduces the hardware cost (size, weight, power, and dollars) of implementing image processing functions, adds capability, and provides one horizontally integrated form factor for all products, allowing embodiments thereof to be used in a broad range of ground, commercial, and missile applications. Delivery of such a broad range of image processing capability is possible via algorithm changes to enable a fully digital implementation without the need for a processor. Embodiments of such a digital implementation can be hosted and evaluated in an FPGA and implemented using an ASIC chip integrated into a 3-D IC package.

Alternative embodiments of the present invention may include security cameras, parts inspection devices, and any other devices employing a monochrome television camera. Alternative embodiments of the present invention may be configured to address applications using cameras operating in single or multiple spectral bands.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein FIG. 1a shows a prior art image processing board and an embodiment of an image processing chip according to the present invention;

FIG. 1b shows an embodiment of an image processing chip according to the present invention;

FIG. 1d shows an embodiment of an IDCA according the present invention and an embodiment of a prior art IDCA configuration;

FIG. 2 shows an embodiment of a SMARTS IP chip coupled with an FPA to configurably function like multiple FPAs of different resolutions.

The drawings will be described in detail in the course of the detailed description of the invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1C:
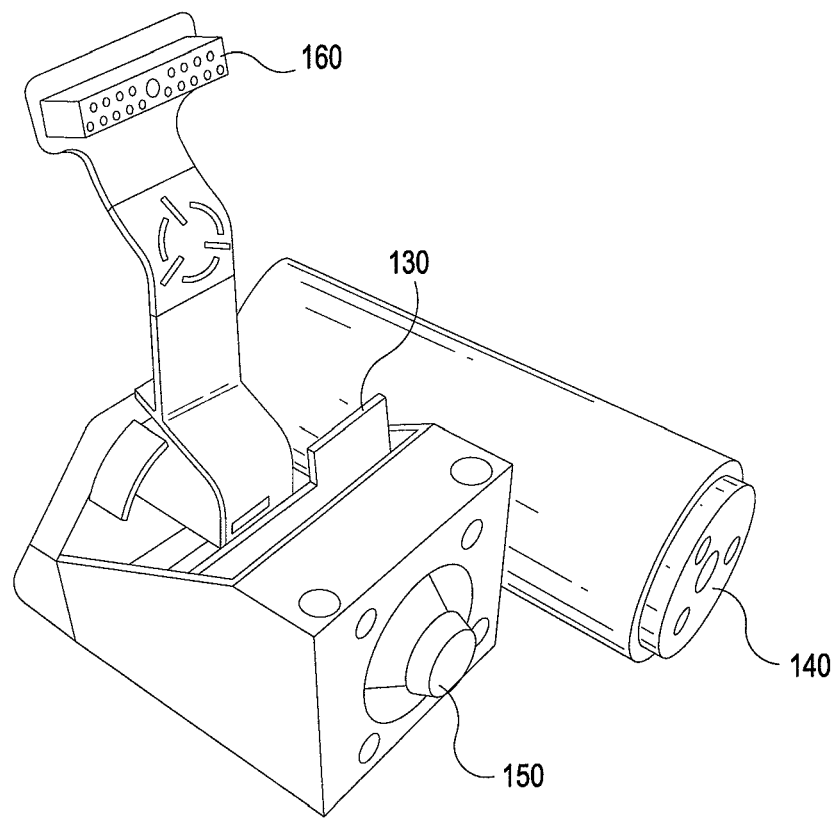
FIG. 1c shows an embodiment of an integrated detector-cooler assembly (IDCA) usable with the present invention.

Current solutions for imaging systems such as an extended-range (XR™) image processing solution include a wide range of specialized, bulky, and high-power components such as micro processors, GPUs, FPGAs and memory chips, which are typical of most current image processing applications. As shown in FIG. 1a, an embodiment of the present invention may replace the electronics suite of an XR™ image processing solution 101 with a programmable chip 111 associated with a high-resolution focal plane array (FPA). As shown in FIG. 1B, embodiments of the programmable chip may include an FPGA or similar programmable logic device or array that can be configured to perform a wide range of image data read-out, integration, and processing functions such as non-uniformity correction, dead pixel replace, edge enhancement, dynamic range compression, bi-linear interpolation, histogram projection, image compression and XR™. In some embodiments, the chip may be contained in a standardized IDCA assembly as shown in FIG. 1C. Such an assembly may include a cooler 140, a dewar 150, an electronics card 130, and an interface 160.

In the depicted IDCA embodiment, an embodiment of a SMARTS IP chip may be embedded within an electronics card 130 disposed behind the dewar flange 150. In a configuration that does not use SMARTS IP, an electronics card would be connected, via the interface 160, to a separate, large image processing card 101 to perform the required processing. Embodiments having a SMARTS IP chip embedded in the electronics card of the DC may omit the additional image processing card, significantly reducing the size and power requirements of the image processing components. In other embodiments, an embodiment of a SMARTS IP chip could be incorporated within the dewar structure next to the FPA. Such embodiments may allow the use of standard electronics cards 130 without requiring significant modification or alteration of the fabrication or assembly process. Such an embodiment is depicted in FIG. 1D.

In the embodiment shown, a vacuum dewar 170 may include both a focal plane array 179 and a SMARTS IP chip 175. Such an assembly will output fully processed image data 173 directly via an electronics card (not shown) as indicated above, or via a similar output channel By contrast, conventional systems include only an FPA 183 in the vacuum dewar 180 and required the use of large, multi-chip image processing electronics and component boards 189 to generate fully processed image data 185. As noted above, even in embodiments where the SMARTS IP chip is disposed outside of the vacuum dewar of an IDCA, or in embodiments where a dewar is not used, a SMARTS IP chip provides considerable savings in terms of cost, weight, size, and power consumption as compared to current multi-chip image processing solutions.

Embodiments of IDCA assemblies containing a SMARTS IP chip may be easily integrated into a wide range of imaging platforms. Some embodiments may allow for retro-fitting of existing systems with an embodiment of the present invention without requiring modification of the FPA or downstream processing portions of an imaging system. Further embodiments of systems using an FPA/SMARTS IP combination may be configured to deliver image data in a format compatible with legacy systems but with enhanced processing already applied. Yet other embodiments may be introduced into larger systems with the SMARTS IP chip being one of the components on a larger circuit card. Still other embodiments may involve using multiple SMARTS IP chips in parallel to accomplish a larger scale task. Even further embodiments may include multiple FPAs connected to one SMARTS IP chip, allowing the chip to perform image processing for persistent surveillance applications using numerous cameras. Still other embodiments could use multiple chips to process different spectral bands for dual or multiple band sensors.

Yet further embodiments may have an FPA and associated SMARTS-IP chip without a dewar (i.e. when FPA cooling isn't required for normal operation). Such embodiments may be suitable for visible-spectrum sensors or micro-bolometer type sensors. Such embodiments may also be useful in areas such as satellite imaging applications, underwater applications, parts inspection on a production floor, or in medical imaging equipment.

Embodiments of the present invention are also especially well suited for both man-portable and airborne systems where weight and power consumption are serious considerations. For example, an embodiment of a SMARTS IP incorporated into an infra-red (IR) missile seeker or a man-portable electro-optical targeting system may provide a savings of up to 1 lb or more in weight and reduce power consumption by a significant amount. Some embodiments may provide power consumption savings of 5 watts or more. Embodiments of a chip used to replace high-power circuit components may provide even more significant power savings. In some embodiments, significant cost savings may be realized, especially for high-quantity systems, because the production costs of a SMARTS IP chip according to the present invention are significantly lower than the cost of even one imaging circuit card. A typical circuit board may cost thousands of dollars whereas a chip according to the present invention may be produced for a few hundred dollars or less. Embodiments of the present invention are also well suited, in view of the cost and weight advantages they provide, for man-portable or light-weight imaging solutions such as handheld cameras, missile seekers, traffic cameras, or vehicle-mounted imaging systems such as a forward-looking infra-red camera that allows for improved night-time operation.

Yet further embodiments of the present invention may be dynamically configurable to behave like a wide range of imaging FPAs, as shown in FIG. 2. An embodiment of a SMARTS-IP chip 210 coupled with a 1296×1040 12 µm mid-wave infra-red FPA 200, for example, may be configured to operate as a 1280×1024 12 µm mid-wave infra-red FPA 230 or as a 640×512 FPA operating at up to 24 µm 240 or as a 320×256 FPA operating at up to 48 µm 250. Further embodiments of SMARTS IP chips may include other combinations or ranges of imaging resolution and different wavebands of sensitivity, such as near infra-red, visible spectrum, or ultra violet. In some embodiments, a standardized FPA arrangement, such as 1280×1024 with a 12 µm pixel, may be configured emulate a range of FPA sizes and resolutions expected by legacy systems.

Yet further embodiments may be configured to accept and output a variety of image data formats. Embodiments of a chip according to the present invention may be configured to generate image data in one of several serial digital interface (SDI) compatible output formats. Such embodiments may generate data in standard definition (SD), high definition (HD), and/or European formats. Embodiments of an SDI output may produce 480p, 720p, and/or 1080p output for interlaced or progressive scan image data. Some embodiments may be configured with range output formats that range from 320×256 to 1280×1024 and higher. Embodiments may be configured to generate 525i and 625i widescreen, 525p, and 625p formats. Yet further embodiments may generate image data in 1080i60, 1080i59.94, 1080i50, 1080p30, 1080p29.97, 1080p25, 1080p24, 1080p23.98, 720p60, 720p59.94, and 720p50 formats. Embodiments may also generate output in several 1035i formats, half-bandwidth 720p standards such as 720p24, and various 1080psf (progressive, segmented frame) formats. Yet further embodiments may generate image data in 1080p60, 1080p59.94, and 1080p50, as well as 4:4:4 encoding, greater color depth, RGB encoding, alpha channels, and nonstandard resolutions.

Embodiments of configurable SMARTS IP chips may also consolidate several frames into a single frame and accomplish versatile charge well depth via frame stacking by using an FPA with a higher than required frame rate. Specifically, embodiments using an FPA running at a multiple of the required system frame rate may allow the resulting frames to be averaged together, creating a composite frame with improved signal-to-noise. Because charge well depth is constrained by the physical limits of wafer processing, breaking charge well collection into separate frames may allow for a larger effective well size, with enhanced dynamic range.

Yet further embodiments of the present invention may be configured for visible-spectrum imaging, such as monochrome or multi spectral band television cameras or image-capture systems. Embodiments of the present invention may be used to significantly reduce the cost, size, and power requirements of portable video recording devices by allowing for the elimination of image processing electronics and an attendant reduction in weight and power requirements—allowing for either smaller, lighter batteries or prolonged operating times.

An embodiment of the present invention is smaller, lighter, uses less power, and may be significantly cheaper to produce than currently implemented image processing solutions. Unlike the multi-component, low-volume production processes associated with current, specialized imaging FPAs and associated read-out and processing hardware, embodiments of the present invention may be fabricated using standard or high-resolution FPAs and their associated read-out integrated circuits (ROICs) connected to a configurable chip according to the present invention.

Embodiments of a SMARTS IP chip may be fabricated using any available manufacturing or production techniques suitable for the creation of an application-specific integrated circuit (ASIC) devices. Yet further embodiments may be created from or with mass-customizable or configurable application specific standard products (ASSPs). Yet further embodiments may include structured ASIC technologies and architectures such as integrated memories, standard interfaces, core processing unit(s), and/or re-configurable logic blocks. Further embodiments still may employ specialized logic hardware configurations.

Once fabricated, embodiments of a SMARTS IP chip may be programmed to perform one or more image processing algorithms using digital circuitry. Programming and circuitry configuration techniques may include any and all suitable techniques currently known or practiced in the art of digital circuit design and configuration. Embodiments may include configuring or otherwise programming a field-programmable gate array (FPGA) or other portions of an application-specific integrated circuit (ASIC). Further embodiments may realize data processing efficiencies through effective combinations of FPGA and logic-only gate array structures. Yet further embodiments may be realized through programming and configuration of structured ASIC devices. Such embodiments may include loading data, instructions, variables, or other parameters into memories, configuring standard or non-standard interfaces, programming or configuring core processing unit(s), and/or placing algorithms, instructions, variables, or other parameters into configurable or re-configurable logic blocks.

Figure 3:
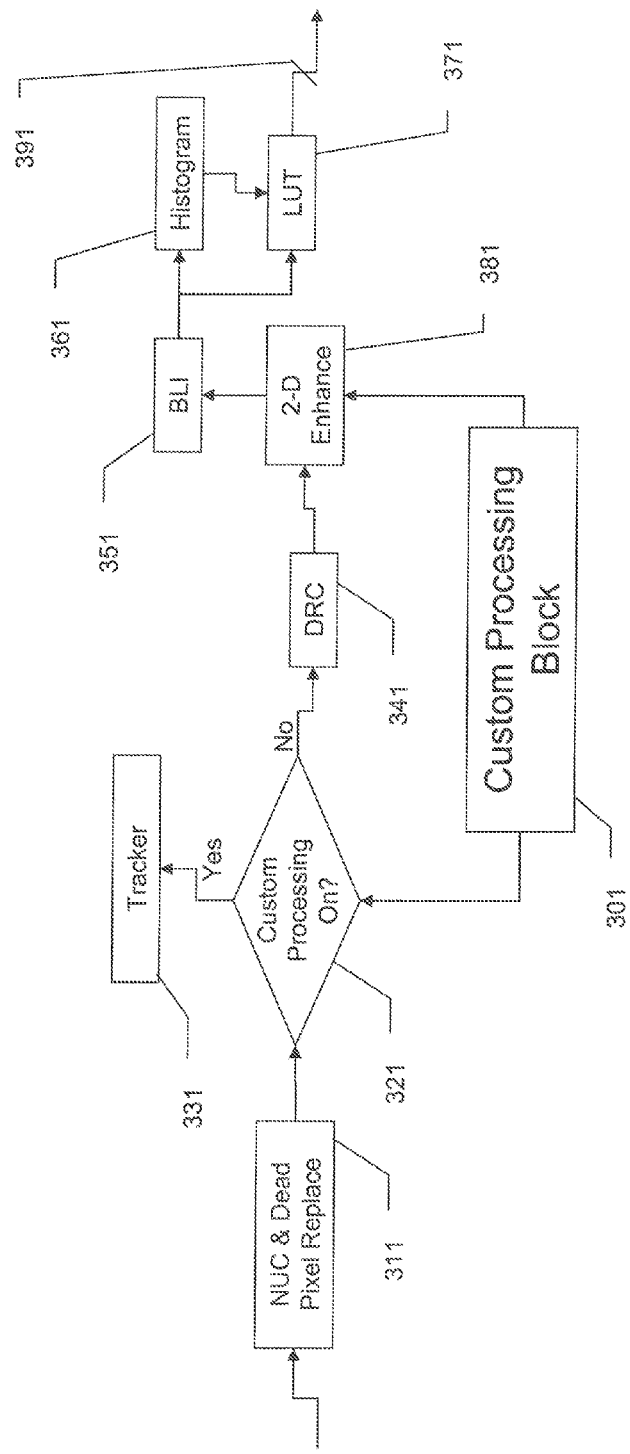
FIG. 3 shows an embodiment of an image processing algorithm that may be programmed or designed into a configurable logic portion of a chip according to the present invention.

An example of an image processing algorithm executed by an FPGA in an ASIC embodiment of a SMARTS IP chip according to the present invention is depicted in FIG. 3. In the embodiment depicted, data read out from an ROIC first goes through a non-uniformity correction (NUC) and dead pixel replacement process 311 to adjust for data irregularities resulting from flaws, imperfections, or non-functional or non-detecting areas of an FPA or similar issues in the ROIC. Alternate embodiments may omit this step or may employ enhanced or expanded versions of NUC and/or pixel replacement. Embodiments configured for frame stacking may omit NUC on data input and instead include such operations as part of a custom processing block 301 configured for frame stacking and signal-to-noise ratio (SNR) improvement. In some visible spectrum embodiments, NUC may be omitted altogether.

In the embodiment shown, if a custom processing block 301, such as a set of instructions or steps for frame stacking, extended range (XR™) processing, super-resolution, thresholding, temporal integration, edge detection, or other custom/specialized image processing, is engaged 321, additional specialized features or functions, such as a tracker 331 in XR™ embodiments, may be activated. In other embodiments, different specialized features or functions may be engaged if a custom processing block is engaged. In further embodiments, a custom processing block may not be associated with further additional functionality.

In the embodiment shown, when XR™ processing is not desired, a dynamic range correction (DRC) 341 block is engaged after NUC 311. DRC may be required for embodiments where an eventual video or image output device may not otherwise be able to effectively display the range of brightnesses or intensities captured by the FPA. DRC may also be utilized in frame stacking embodiments as part of a noise-reduction aspect. In yet further embodiments, DRC may be used on the XR™ processed data. Alternate embodiments may omit a DRC operation, include it as part of a custom processing portion, or may replace or augment it with standard compression techniques such as JPEG or MPEG compression.

In the embodiment shown, corrected image data and image data from a custom processing block 301 may be fed to a two-dimensional enhancement block 381. Embodiments of two-dimensional enhancement may be used as part of a data consolidation or integration process in frame-stacking embodiments. Further embodiments may include any suitable or available image processing techniques and may depend on the specific application or intended purpose of an embodiment of a chip according to the present invention. The processing block embodiment depicted an example of one configuration of an image processing algorithm. Alternate embodiments may include, omit, or combine techniques such as DRC, XR™, NUC, Scene based NUC, etc.

In the embodiment shown, the 2-d enhanced image data is then passed to a bilinear interpolation block 351. Alternate embodiments may pass data directly from a dynamic range corrector 341, custom processing block 301, or from an NUC block 311 to a BLI block 351. Yet further embodiments may omit BLI or replace it with a different interpolation technique such as nearest neighbor or bicubic.

In the embodiment shown, the interpolated image data is used to generate a histogram 361 and a lookup table 371. In some embodiments, the color histogram 361 may be used to refine or condense a color lookup table 371 before the image data is output 391 for further processing and analysis. Such color processing embodiments may be implemented by separating the individual color signals (red, green, and blue signals for RGB processing, for instance), and processing each color independently, and then recombining them.

The embodiment depicted is only one example of several image processing algorithms suitable for embedding or encoding onto a chip according to the present invention. Alternate embodiments of image processing algorithms may include frame stacking and SNR improvement techniques. Yet other embodiments might include data compression techniques such as MPEG data compression, for use in networked sensor down-link applications. Yet further embodiments may omit a custom processing block while others may have multiple, selectable, simultaneous, or serially-engaged custom processing blocks for switching between or combining techniques such as XR™, scene-based NUC, super-resolution, frame stacking, and other similar image data processing techniques.

The data output 391 may be accomplished through standard or customized on-chip interfaces or buses. Embodiments of an interface may be programmed or configured for a variety of output formats. As noted above, embodiments configured to produce SDI-compatible output formats may be programmed or otherwise configured to produce 480p, 720p, and/or 1080p output for interlaced or progressive scan image data. Some embodiments may be programmed or otherwise configured to generate image data in 525i and 625i widescreen, 525p, and 625p formats. Yet further embodiments may be programmed or otherwise configured to generate image data in 1080i60, 1080i59.94, 1080i50, 1080p30, 1080p29.97, 1080p25, 1080p24, 1080p23.98, 720p60, 720p59.94, and 720p50 formats. Embodiments may also be programmed or otherwise configured to output image data in several 1035i formats, half-bandwidth 720p standards such as 720p24, and various 1080psf (progressive, segmented frame) formats. Yet further embodiments may be programmed or otherwise configured to output image data in 1080p60, 1080p59.94, and 1080p50, as well as 4:4:4 encoding, greater color depth, RGB encoding, alpha channels, and nonstandard resolutions.

Referring back to FIG. 1C, in some embodiments the interface 160 of an IDCA may be connected to an output of an embodiment of a SMARTS IP chip, thereby allowing an IDCA to directly feed image or video data to downstream systems without additional processing hardware and without significant re-configuration of the physical interfaces between the IDCA and other components. In other embodiments, an interface adapter may be employed to extract data from a SMARTS IP chip that may or may not be part of an IDCA assembly. Potential physical interfaces may include any suitable structures that can transmit the format and rate of image data being output from an embodiment of a SMARTS IP chip according to the present invention. Embodiments of SMARTS-IP equipped IDCAs may employ an SDI or SDI-compatible physical interface. Alternate embodiments may employ USB interfaces, serial port connectors, component video, HDMI, Ethernet, 1553, or any other suitable physical protocol. Embodiments of SMARTS IP chips not included or embedded in an IDCA may employ similar physical interface technologies and paradigms.

Embodiments of a chip according to the present invention may be loaded with multiple algorithms and/or operating parameters, with appropriate algorithms, parameters, and FPA control modes selected or otherwise configured during fabrication and configuration of the overall imaging device (such as during assembly or installation of an IDCA). Alternate embodiments may allow for post-assembly or post-installation configuration through changes to on-chip instructions, logic configurations, and stored parameters/values. Yet further embodiments may be configured for run-time configuration. Configuration may include complex programming or re-programming operations or parameter selection processes, or may include switching between one of a set of operating profiles or algorithm and/or parameter sets. In some embodiments, frame stacking and FPA resolution modes may be pre-set in a chip such that a technician or device operator may select, during installation, operation, or maintenance, a particular effective resolution and/or charge well depth. Further embodiments may include a configuration interface portion on the chip that allows a configuration program or device to read and write parameters and adjust operating parameters on the chip during imaging system assembly, installation, maintenance, and/or real-time operation. Yet further embodiments may include data format output configuration capabilities to allow technicians or operators to adjust or select a particular image data output format or range of formats, allowing data from an FPA to be easily displayed or processed by a range of display and/or downstream processing solutions.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method of making an image generation system comprising:
   connecting a programmable image processing chip to a read-out integrated circuit of a 1296×1040 12 μm pixel pitch infra-red focal plane array (FPA) device;
   programming a desired image processing algorithm into said programmable image processing chip;

configuring the programmable image processing chip to read and output image data from the FPA device as though the FPA device was one of a: 1280×1024 FPA device comprising a 12 μm pixel pitch, a 640×512 FPA device comprising up to a 24 μm pixel pitch, or a 320× 256 FPA device comprising up to a 48 μm pixel pitch; and interfacing said programmable image processing chip with image output and post-capture processing hardware.

2. The method of claim 1, said configuring including configuring said programmable image processing chip to perform a variable number of frame averages (stacking) on input image data frames from the read-out integrated circuit to generate the output image data having an effective pixel resolution less than a physical pixel resolution of the FPA device and/or having an effective charge well depth greater than or equal to a physical charge well depth of the FPA device, where the variable number is determined by a difference between a frame rate of the FPA device and a desired frame rate of generated output image data.

3. The method of claim 1, the method further comprising disposing said programmable image processing chip into a warm area of a dewar or within an Integrated-Detector-Cooler-Assembly package.

4. The method of claim 1, said configuring including configuring the programmable image processing chip to output the image data in a serial digital interface (SDI)-supported data format.

5. The method of claim 4, where the SDI-supported data format is one of 1080i60, 1080i59.94, 1080i50, 1080p30, 1080p29.97, 1080p25, 1080p24, 1080p23.98, 1060p50, 720p60, 720p59.94, 480p, 525p, 525i, 1080psf, and 720p50, wherein i=interlaced, p=progressive, and psf=progressive segmented frame.

6. The method of claim 1, the method further comprising replacing specialized image processing hardware with the programmable image processing chip.

7. A method of making an image generation system comprising:
connecting a programmable image processing chip to a read-out integrated circuit of a first infra-red (IR) focal plane array (FPA) device having a first resolution and a first pixel pitch;
programming a desired image processing algorithm into said programmable image processing chip;
configuring the programmable image processing chip to read and output image data from the FPA device as though the FPA device was one of a: second IR FPA device having a second resolution and the first pixel pitch, a third IR FPA device having a third resolution and a second pixel pitch that is twice the first pixel pitch, and a fourth 1R FPA device having a fourth resolution and a third pixel pitch that is four times the first pixel pitch; and
interfacing said programmable image processing chip with image output and post-capture processing hardware.

8. The method of claim 7, wherein the second resolution is less than the first resolution, the third resolution is less than the second resolution, and the fourth resolution is less than the third resolution.

9. The method of claim 7, further comprising disposing said programmable image processing chip into a warm area of a dewar or within an Integrated-Detector-Cooler-Assembly package.

10. The method of claim 7, said configuring including configuring the programmable image processing chip to output the image data in a serial digital interface-supported data format.

* * * * *